Aug. 3, 1954
A. P. BRIETZKE
2,685,227
OPAQUE MICROPHOTOGRAPH PROJECTOR
Filed Nov. 28, 1949
2 Sheets-Sheet 1
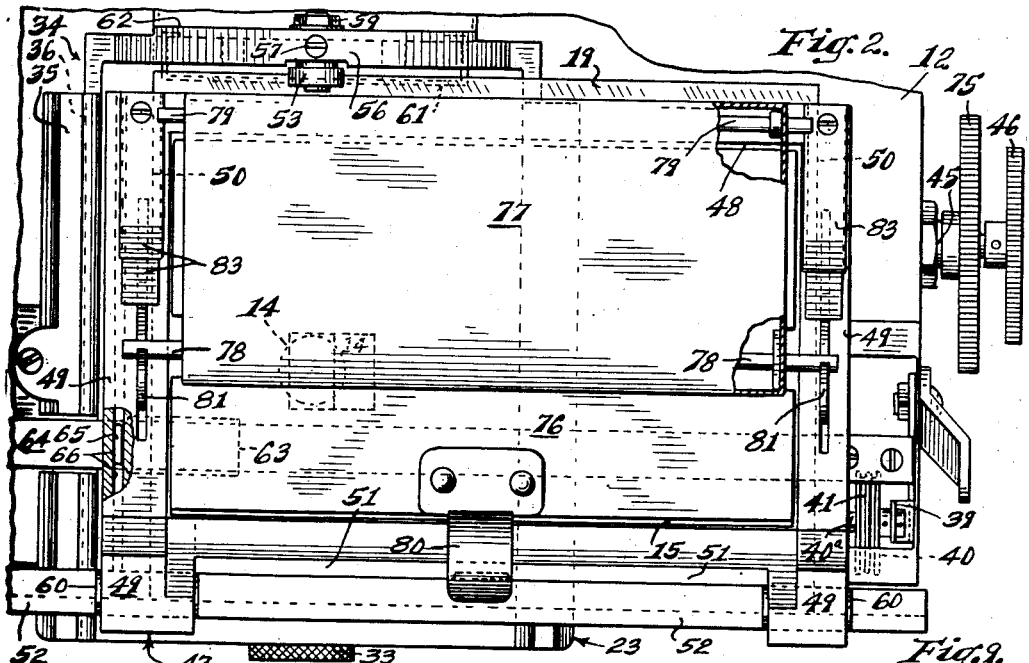
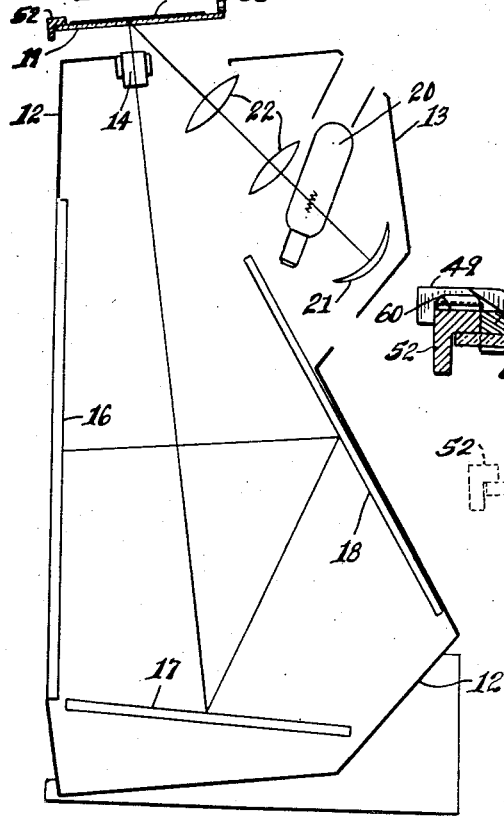
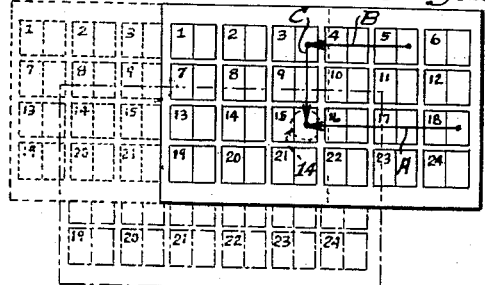
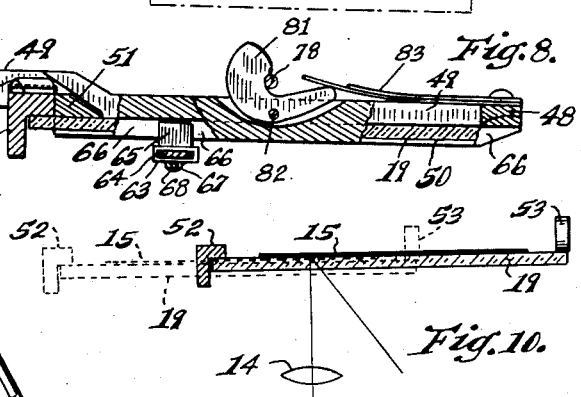
Inventor.
Adrian P. Brietzke.
By Bair & Freeman
Att'ys.

Aug. 3, 1954
A. P. BRIETZKE
2,685,227
OPAQUE MICROPHOTOGRAPH PROJECTOR
Filed Nov. 28, 1949
2 Sheets-Sheet 2
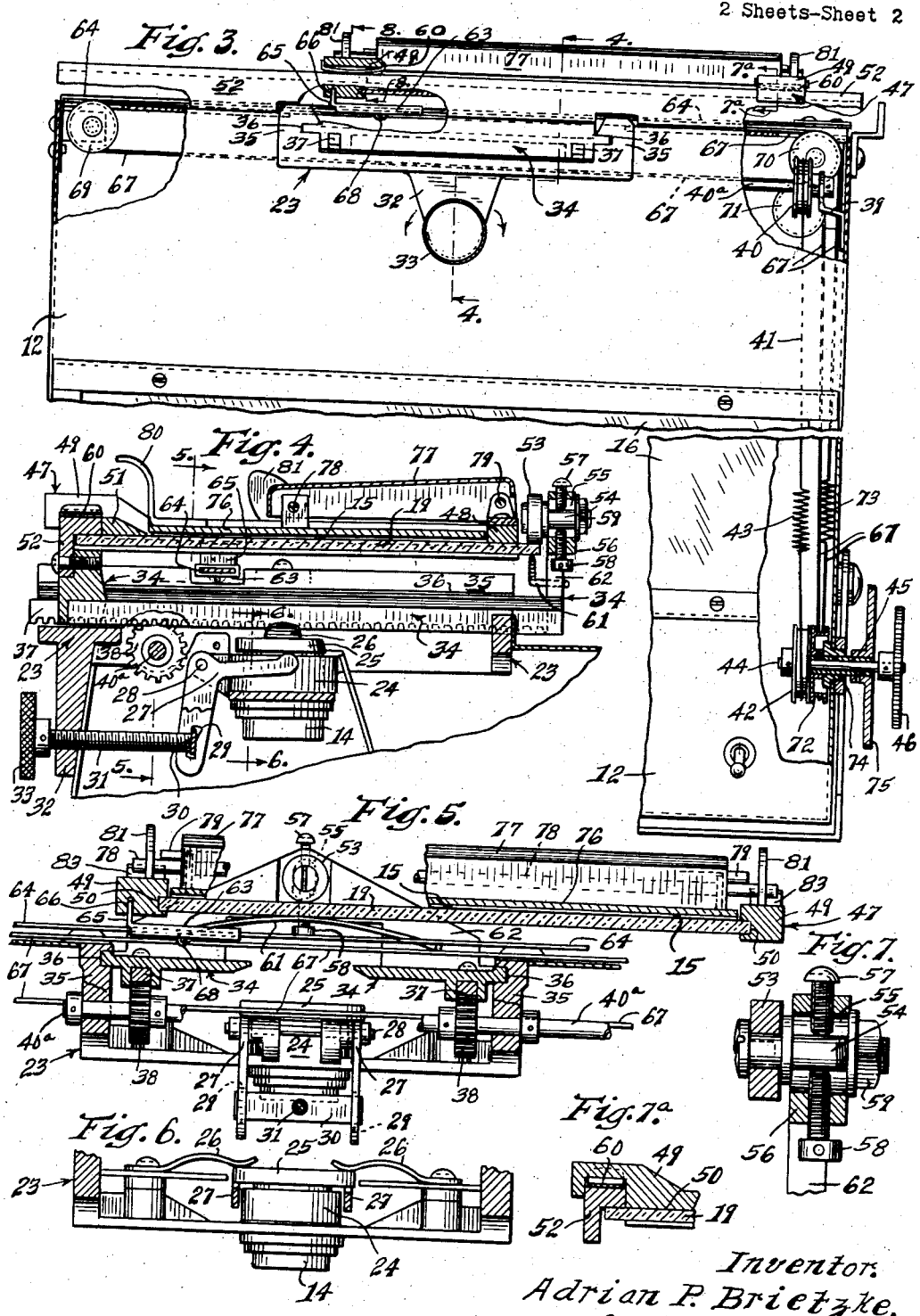
Inventor.
Adrian P. Brietzke.
By Bair & Freeman
Attys.

Patented Aug. 3, 1954

2,685,227

UNITED STATES PATENT OFFICE 2,685,227

OPAQUE MICROPHOTOGRAPH PROJECTOR

Adrian P. Brietzke, La Crosse, Wis., assignor to Northern Engraving & Manufacturing Co., La Crosse, Wis., a corporation of Wisconsin Application November 28, 1949, Serial No. 129,754

3 Claims. (Cl. 88—26)

This invention relates to a microphotograph carrier or a carrier for a microphotograph in a microphotoscope or so-called "micro-reader."

The main object of the invention is to provide a microphotograph carrier which, during the shifting thereof from one page to another photographed on the micro-card, will not change the focus or distance from the lens to the illuminated surface of the card. Heretofore, microphotograph carriers have been made which included transparent supports for the microphotograph and the carrier was mounted in a frame which could be adjusted in a plane, and in either of two directions at right angles to each other, so as to shift the microphotograph for the purpose of bringing the various pages photographed thereon in alignment with the lens of the microphotoscope. Any variation in the distance between the photographic surface and the lens changed the focus so that it was accordingly necessary to form the guides for the carrier very accurately and have them accurately aligned with respect to the axis of the lens which calls for prohibitive custom work on each carrier.

Another object of my invention therefore is to eliminate the necessity of such careful work in the making and aligning of the carrier by a simple expedient which utilizes the upper surface of the glass or other transparent material used for the microphotograph support as a gauge surface which is accurately positioned in relation to the lens by a guide element and an abutment without reference to the parts of the frame that carry the microphotograph support.

A further object is to provide an arrangement wherein a base supports one frame for movement in a plane in one direction and a second frame for movement in a plane substantially parallel to the first plane and in a direction at substantially right angles to the first direction of movement, the second frame carrying a support for a microphotograph so that any unit throughout the area of the microphotograph may be presented over a lens for enlargement of such unit, the support being in the form of a piece of ordinary window glass and provision being made for guiding the surface thereof which contacts the microphotograph so as to insure that it will in all positions of adjustment be the same distance from the lens of the microphotoscope.

More particularly, it is my object to provide means for positioning the microphotograph contacting surface of the transparent support comprising an abutment on one side of the axis of the lens and an element on the other side which may consist of an elongated abutment or track for contacting at least two points on said surface of the support so that as the support is moved in one of the directions mentioned it will move in relation to the abutments and when moved in the other direction mentioned the movement will be accomplished by moving the first frame and carrying with it the second frame.

Still another object is to provide a means to insure that movement in such "other direction" will cause the support to remain in focus from side to side (as distinguished from end to end of the microphotograph) consisting of a means to adjust one of the abutments toward or away from the plane of the lens to thereby position the units adjacent opposite sides of the support the same distance from the lens when the first frame is moved relative to the base.

An additional object is to provide a simplified means to move the first and second frames without lost motion and with a minimum of parts which operate in a trouble-free manner.

With these and other objects in view, my invention consists in the construction, arrangement and combination of the various parts of my microphotograph carrier, whereby the objects contemplated are attained, as hereinafter more fully set forth, pointed out in my claims and illustrated in the accompanying drawings, wherein:

Figure 1 is a vertical sectional diagram of a microphotoscope to which my invention has been applied.

Figure 2 is a plan view of my microphotograph carrier and adjacent portions of the microphotoscope including the operating knobs for the carrier.

Figure 3 is a front elevation of the carrier and knobs and the adjacent portions of the microphotoscope.

Figure 4 is an enlarged sectional view on the line 4—4 of Figure 3.

Figures 5 and 6 are sectional views on the lines 5—5 and 6—6, respectively, of Figure 4.

Figure 7 is a further enlarged view of the upper right hand portion of Figure 4 showing a roller in section.

Figure 7a is a sectional view on the line 7a—7a of Figure 3.

Figure 8 is a sectional view on the line 8—8 of Figure 3.

Figure 9 is a diagrammatic view showing, at different adjustments, the relationship of a microphotograph and the various page units thereon to the lens of the microphotoscope, and Figure 10 is a diagrammatic view to show the effect of one adjustment of my microphotograph carrier.

On the accompanying drawings I have used the reference numeral 12 to indicate in general a sheet metal housing made of the cross-sectional shape shown in Figure 1 and having a subhousing 13 thereon which constitutes a lamp housing. A lens 14 is provided for focusing the image from a microphotograph 15 on a ground glass 16 after the image is reflected on a pair of mirrors 17 and 18. The microphotograph is carried by a transparent support 19 and light from a projection bulb 20 is used for illuminating the microphotograph. The usual reflector 21 and condensers 22 are provided in the light system and the foregoing elements constitute the main elements of a microphotoscope.

First of all, I provide a base 23 which is adapted to be mounted on the top of the housing 12 and may include a means to support the lens 14. In referring to the element 14 as a lens, I actually mean the entire lens assembly including the barrel in which it is mounted, these being special units that can be secured on the market and mounted in many different ways. In the present instance, I provide the base 23 with a boss 24 in which the lens barrel may slide vertically. The lens barrel has a flange 25 at the top and I provide a pair of leaf springs 26 to slide the barrel downwardly against a pair of bell cranks 27. The bell cranks are pivoted at 28 to arms extending from the base 23 and are provided with openings 29 to receive a cross bar 30. The cross bar 30 is seated at its center against an adjusting screw 31 threaded in an ear 32 depending from the base 23 and provided with a control knob 33 for focusing.

Slidably mounted in a fore-and-aft direction on the base 23 is a first frame 34. Referring to Figure 5, it will be noted that the base 23 has upstanding sides 35 provided with slideways 36 in which the side edges of the first frame 34 may slide.

For effecting the sliding movement, I provide a pair of racks 37 meshing with pinions 38 on a shaft 40a. The shaft is journalled in the sides 35 of the base and extends as shown in Figures 1 and 3 to a bracket 39 in which it is also journalled, a pulley 40 being secured to the shaft adjacent the bracket.

For rotating the pulley 40, I provide a flexible element 41 such as a cable or cord extending around the pulley 40 and around a second pulley 42, a spring 43 being provided as a connection between the ends of the cable to take up any lost play. The pulley 42 is secured to a shaft 44 journalled in a sleeve 45 and terminating in a control knob 46. Thus the fore-and-aft movement of the first frame relative to the base may be effected by rotation of the knob 46 in the proper direction.

A second frame 47 is mounted for movement with respect to the first frame 34. The frame 47 consists of a cross bar of rectangular cross-section at the back indicated at 48 (see particularly Figure 4), a pair of arms 49 extending forwardly therefrom as shown in Figure 4 and a front cross bar 51. The arms 49 are grooved at 50 to receive the ends of the transparent microphotograph support 19 whereas the front and rear sides of the support 19 are unsupported by the second frame but merely contact the under surfaces of the back and front cross bars 48 and 51.

Guide means is then provided for the second frame in relation to the first frame in the form of an abutment comprising a roller 53 and a guide element or elongated abutment comprising a track 52 of angle shape as shown in Figure 4. The track 52 is substantially straight and is carried by the first frame 34 as by mounting it thereon by means of screws 54 and the roller 53 is carried by an upstanding supporting flange 62 of the first frame 34 as shown in this figure and in Figure 7. The roller 53 is rotatable on a spindle 54 which is mounted in a vertically elongated opening or slot 55 in a boss 56 of the flange 62. Thus the spindle can be vertically adjusted and to effect such adjustment screws 57 and 58 are provided. The spindle can be unlocked and locked relative to the boss 56 by a lock nut 59 threaded on the spindle for permitting such adjustment and for retaining it after it is effected.

It will be noted that the upper surface of the glass 19 engages the lower surface of the track 52 and the bottom of the roller 53. This is accomplished by a pair of leaf springs 60 mounted in the forward ends of the arms 49 (left one sectioned in Figure 3, also see Figure 7) and by means of a spring wire 61 opposing the roller 53 (see Figures 4 and 5). The ends of the wire 61 are bent at right angles and extended through the supporting flange 62. The springs 61 tend to raise the arms 49 relative to the track 52 to engage 19 with its under surface and the spring 61 tends to raise 19 thereby causing it to remain in contact with the roller 53.

For moving the microphotograph support 19 laterally, I provide a sheet metal clip 73 located below the second frame 47 and slidable on a bar 64. The clip has an upstanding flange 65 slidable in a groove 66 of the left hand arm 49 of the second frame. Accordingly, as the clip 63 is adjusted to the right or left it will similarly move the second frame and the flange 65 and groove 66 provide an arrangement which permits the first frame to be adjusted in a fore-and-aft direction and carried with the second frame yet retain an operative connection between the clip 63 and the second frame in all fore-and-aft positions.

For moving the clip 63 laterally, I provide a flexible element 67 secured thereto as at 68 and passing around a pulley 69 and over a pair of pulleys 70 and 71. The cable 67 then passes downwardly as in Figure 3 and around a pulley 72 which is mounted on the sleeve 45, a spring 73 similar to the spring 43 being provided to take up play. The sleeve 45 is journalled in a bushing 74 secured in the side of the housing 12 and on the sleeve a control knob 75 is provided.

From the description of the parts just referred to, it is obvious that rotation of the knob 75 will move the cable 67 and consequently the clip 73 for thereby moving the second frame 47 in a lateral direction. Additionally, the second frame is movable in a fore-and-aft direction by rotation of the knob 46 because the second frame is carried with the first frame which is adjusted by rotation of this latter knob.

Referring again to Figure 4, it will be noted that the microphotograph 15 is placed on the top surface of the glass 19. It is held in this position by a closure plate 76 which is hingedly connected to the back cross bar 48 of the second frame by an arm connection comprising a plate 77 and pivot connections 78 and 79. A handle 80 is provided on the plate 76. The pivot rod 78 extends from the ends of the plate 77 and is adapted to be engaged by hooks 81 (see Figure 8) which are pivoted at 82 and biased to engage over the rod 78 by leaf springs 83 in order to retain the closure plate and thereby hold the microphotograph 15 flat against the glass 19.

Referring to Figure 9, the microphotograph shown at 15 has a plurality of page units thereon numbered 1 to 24. The lens position is indicated by the circle 14 which, in the solid line position shown, happens to register with page unit No. 15. In order for unit 18 to register with 14, it is obvious that the microphotograph 15 has to be moved in a straight line toward the left as indicated by the arrow A whereupon the microphotograph would occupy the dotted line position. This is accomplished by rotating the knob 75 in the proper direction.

Assume, however, that unit No. 5 is to be placed over the lens 14. Knob 75 is rotated in order to shift No. 5 into alignment with the lens as indicated by the arrow B, and then knob 46 is rotated to shift the No. 5 position downwardly until it registers with the lens as indicated by the arrow C. The card 15 would then be in the position shown by dash lines. Of course in reading the pages from a card, the usual sequence is to read the pages in the consecutive order numbered in Figure 9, the diagram being taken as though looking upwardly at the card in the position shown in the other figures of the drawings. It is obvious, therefore, that there is a considerable field covered by the total movement of the microphotograph carrier, and at each of the positions 1 to 24 it is of course desirable that focus be sharp.

If for any reason the photographic surface of the microphotograph at any one of the positions is farther away from or closer to the lens within a few thousandths of an inch, then portions of the photograph will be out of focus during the various adjustments from page to page. In the prior art devices, either this occurred or the carrier for the microphotograph had to be so accurately made that it was impractical except at great expense to make one that was satisfactory. Even then, trouble was experienced in keeping it accurate.

With my arrangement, however, even though the glass may vary in thickness from end to end or side to side (which is quite often the case with ordinary glass) there is accurate positioning of its upper surface with relation to the lens and it is the upper surface that is critical because this is the surface against which the photographic record on the microphotograph engages. Therefore, by providing the track 52 and the roller 53 with resilient biasing of the upper surface of the glass against them, their position can be easily fixed with relation to the lens and thereafter the glass used or another one which may be substituted for it will always be in proper adjustment. The springs 60 and 61 act in such manner as to resiliently bias the upper surface of the glass against the track 52 and the roller 53 and this condition remains throughout all positions of adjustment of the knobs 46 and 75.

An initial factory adjustment of the screws 57 and 58 correct for any manufacturing tolerances which result in the lower surface of the roller 53 and the under surface of the track 52 being different distances from the plane of the lens 14 when the frames are adjusted thereover. This is shown diagrammatically in Figure 10 wherein the rearward position of the second frame is shown by solid lines and the forward position by dotted lines. Actually the glass is shown slanting slightly with respect to the axis of the lens 14 because the roller 53 is a little too low so that the upper surface of the glass is closer to the lens when the roller is adjacent the lens axis (dotted position). It is then merely necessary after having focused by means of the knob 33 for the front margin of the glass to move the glass forward and adjust the screws 57 and 58 until the back margin of the glass is also in sharp focus (raised to the same distance from the lens) as determined of course by observation on the ground glass 16. The lock nut 59 for the roller 53 may then be tightened and the adjustment is set for subsequent use. Thus by the use of one abutment such as the roller 53 at one side of the lens axis and another abutment such as the track (52) at the other side with the glass slidable along the abutments, I am able to have all increments of the top surface of the glass the same distance from the lens so that focus is not affected regardless of any possible adjustment accomplished by the knobs 46 and 75.

This arrangement eliminates the necessity of using an expensive glass such as one which has been ground to true flatness and in most cases a substantially straight track 52 is satisfactory. Any irregularities in the surface of the glass will, in any event, be not more than a few ten thousandths of an inch which is permissible and will permit at least a two point engagement with the track 52 as distinguished from a theoretical line contact produced by a perfectly straight track and a perfectly level glass surface. Some of my claims have accordingly been worded to refer to two-point contact along the track.

Instead of making the track straight, it may be made slightly convex a few thousandths of an inch on the lower surface to take care of the possibility of a slightly concave upper glass surface and this would also take care of a straight glass surface and one that was slightly convex.

In any case there would be at least two points of contact between the glass and the track opposite the third point of contact which is the roller 53 and the glass thus held with the portion of its surface over the lens at the proper distance from the lens for sharp focus. Lenses of this character are of quite short focal length and therefore focusing is quite critical but with my arrangement I have found that when once adjusted, the focus remains constant throughout the entire surface of the microphotograph and slight base and frame misalignments are permissible without detracting from the sharpness of the image formed on the ground glass. Thus my microphotograph carrier is much less critical to manufacture and accordingly less expensive yet secures results comparable with those carriers which are made with extreme accuracy.

Some changes may be made in the construction and arrangement of the parts of my device without departing from the real spirit and purpose of my invention, and it is my intention to cover by my claims any modified forms of structure and use of mechanical equivalents which may be reasonably included within their scope without sacrificing any of the advantages thereof.

I claim as my invention:

1. A microphotograph viewer comprising a screen for receiving a projected picture thereon, a flat transparent contact plate having positioned against one side thereof that surface of a substantially opaque microphotograph which is to be projected, a source of light for illuminating said surface to be projected, projection objective lens means for focusing and directing reflected light from the microphotograph surface onto said screen, said source of light and said lens means both being positioned at the side of said contact plate which is opposite to the side against which said microphotograph is positioned, said light and said lens being in operative optical alignment with respect to said contact plate so as to project light through said contact plate onto said microphotograph surface to be projected, for reflection therefrom back through said contact plate and said lens along a projection axis extending to said screen, said contact plate thereby lying at all times between said microphotograph surface to be projected on the one side and said light source and projection axis on the other side, said microphotograph when positioned against said transparent contact plate being movable in operative projecting position before said lens in directions perpendicular to the optical axis of said lens, means for maintaining the side of said transparent contact plate against which the microphotograph is positioned in a plane perpendicular to said optical axis, and a backing plate clamping substantially all of that portion of the microphotograph surface to be projected against the transparent contact plate to maintain said surface to be projected flat thereagainst to iron out irregularities of said surface and to permit visual inspection thereof without disturbing the distance alignment between said contact plate and said lens.

2. A microphotograph viewer comprising a screen for receiving a projected picture thereon, a flat transparent contact plate having positioned against one side thereof that surface of a substantially opaque microphotograph which is to be projected, a source of light for illuminating said surface to be projected, projection objective lens means for focusing and directing reflected light from the microphotograph surface onto said screen, said source of light and said lens means both being positioned at the side of said contact plate which is opposite to the side against which said microphotograph is positioned, said light and said lens being in operative optical alignment with respect to said contact plate so as to project light through said contact plate onto said microphotograph surface to be projected, for reflection therefrom back through said contact plate and said lens along a projection axis extending to said screen, said contact plate thereby lying at all times between said microphotograph surface to be projected on the one side and said light source and projection axis on the other side, said contact plate with said microphotograph positioned thereagainst being movable in one direction substantially perpendicular to the optical axis of said lens, and movable in a second direction substantially perpendicular to said first direction and substantially perpendicular to the optical axis of said lens, and means for maintaining that surface of the transparent contact plate against which the microphotograph is positioned in a plane substantially parallel to both directions of movement of the microphotograph and a backing plate clamping substantially all of that portion of the microphotograph surface to be projected against the transparent contact plate to maintain said surface to be projected flat thereagainst to iron out irregularities of said surface and to permit visual inspection thereof without disturbing the distance alignment between said contact plate and said lens.

3. A microphotograph viewer comprising a screen for receiving a projected picture thereon, a flat transparent contact plate having positioned against one side thereof that surface of a substantially opaque microphotograph which is to be projected, a source of light for illuminating said surface to be projected, projection objective lens means for focusing and directing reflected light from the microphotograph surface onto said screen, said source of light and said lens means both being positioned at the side of said contact plate which is opposite to the side against which said microphotograph is positioned, said light and said lens being in operative optical alignment with respect to said contact plate so as to project light through said contact plate onto said microphotograph surface to be projected, for reflection therefrom back through said contact plate and said lens along a projection axis extending to said screen, said contact plate thereby lying at all times between said microphotograph surface to be projected on the one side and said light source and projection axis on the other side, said contact plate being mounted on a first frame movable in a direction perpendicular to the optical axis of said lens, said frame being supported on a second frame movable in a direction substantially perpendicular to the direction of movement of the first frame and in a direction substantially perpendicular to the optical axis of said lens, means for moving said first and second frames, and means for maintaining that surface of the transparent contact plate against which the microphotograph is positioned in a plane substantially parallel to the plane of movement of said second frame, and a backing plate clamping substantially all of that portion of the microphotograph surface to be projected against the transparent contact plate to maintain said surface to be projected flat thereagainst to iron out irregularities of said surface and to permit visual inspection thereof without disturbing the distance alignment between said contact plate and said lens.

References Cited in the file of this patent

UNITED STATES PATENTS

| Number | Name | Date |
|---|---|---|
| 766,967 | Newman | Aug. 9, 1904 |
| 1,368,880 | Bettini | Feb. 15, 1921 |
| 1,407,906 | Wenderhold | Feb. 28, 1922 |
| 1,437,895 | Horst | Dec. 5, 1922 |
| 1,551,451 | Anderson et al. | Aug. 25, 1925 |
| 1,808,836 | Caps | June 9, 1931 |
| 1,828,768 | Dina | Oct. 27, 1931 |
| 1,888,054 | Tipecska et al. | Nov. 15, 1932 |
| 1,927,887 | Crespinel | Sept. 26, 1933 |
| 2,076,853 | McClure | Apr. 13, 1937 |
| 2,081,329 | Gordon | May 25, 1937 |
| 2,256,178 | Stuart | Sept. 16, 1941 |
| 2,260,551 | Boni et al. | Oct. 28, 1941 |
| 2,298,369 | Greaves | Oct. 13, 1942 |
| 2,326,042 | Lessman | Aug. 3, 1943 |
| 2,341,098 | Hansen | Feb. 8, 1944 |
| 2,369,248 | Pratt | Feb. 13, 1945 |
| 2,431,662 | Ralph | Nov. 25, 1947 |
| 2,534,561 | Silver | Dec. 19, 1950 |

FOREIGN PATENTS

| Number | Country | Date |
|---|---|---|
| 564,275 | Germany | Nov. 17, 1932 |